United States Patent [19]
Stambaugh, Sr. et al.

[11] Patent Number: 5,983,621
[45] Date of Patent: Nov. 16, 1999

[54] METHOD FOR CONTROLLING THE FLOW RATE OF FUEL WITHIN A GAS TURBINE

[75] Inventors: Craig T. Stambaugh, Sr., Port St. Lucie, Fla.; Jeffrey W. Parker, Old Fort, N.C.; Steven P. Sides, Palm Beach Gardens, Fla.

[73] Assignee: United Technologies Corporation, Hartford, Conn.

[21] Appl. No.: 08/927,679

[22] Filed: Sep. 10, 1997

Related U.S. Application Data

[62] Division of application No. 08/635,224, Apr. 17, 1996, Pat. No. 5,772,182.

[51] Int. Cl.$^6$ ........................................................ F02C 7/22
[52] U.S. Cl. ................................................................ 60/39.03
[58] Field of Search ........................... 60/39.03, 39.281, 60/734; 137/557; 251/325

[56] References Cited

U.S. PATENT DOCUMENTS

| | | | |
|---|---|---|---|
| 574,500 | 1/1897 | Stow et al. ........................... | 137/557 |
| 2,941,602 | 6/1960 | Coan ..................................... | 60/39.281 |
| 3,002,350 | 10/1961 | Longstreet ........................... | 60/39.281 |
| 4,760,662 | 8/1988 | Dyer et al. ........................... | 60/39.281 |
| 5,315,818 | 5/1994 | Smith ................................... | 60/39.281 |

*Primary Examiner*—Louis J. Casaregola
*Attorney, Agent, or Firm*—Richard D. Getz

[57] ABSTRACT

A valve for controlling the flow of fuel within a gas turbine engine is provided. The fuel flow control valve includes a valve block disposed within a sleeve, and apparatus for displacing one of the sleeve or valve block relative to the other. The sleeve includes an inlet port and an exit port. The valve block includes an inlet gate and an exit gate. One of the sleeve or the valve block may be displaced relative to the other from a closed position where the gates close the ports and thereby prevent fluid flow through the valve via the ports, to a plurality of open positions where the gates less than completely close the ports, and thereby allow fluid flow through the valve via the ports.

8 Claims, 2 Drawing Sheets

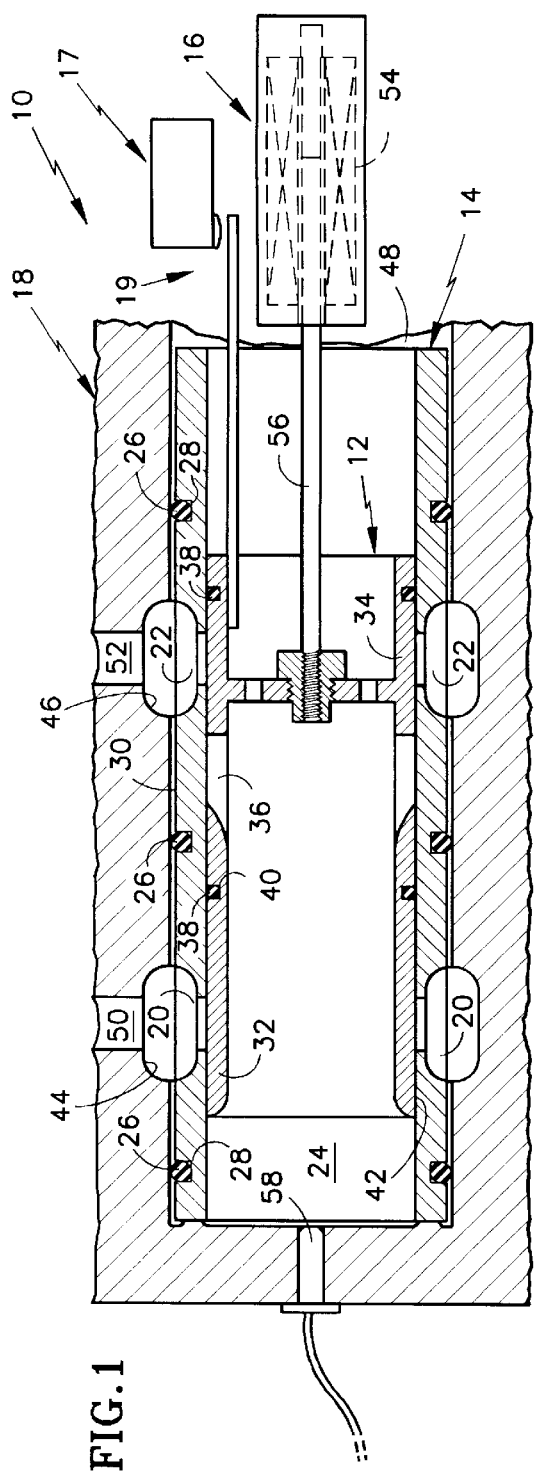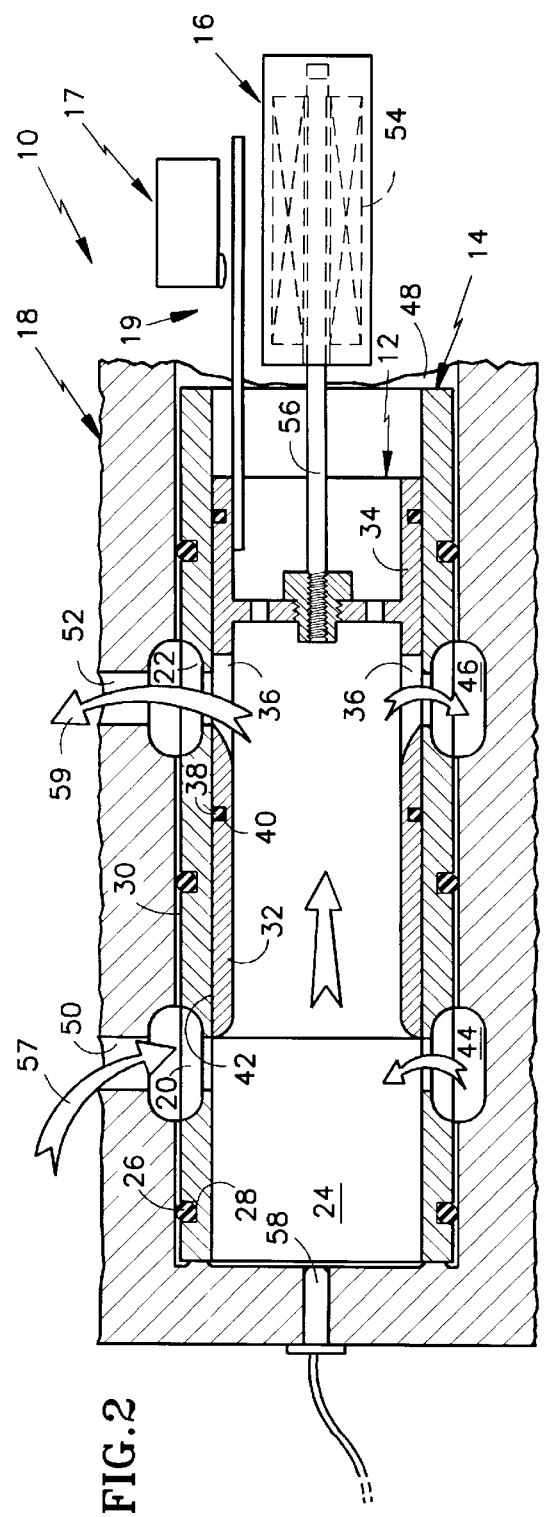

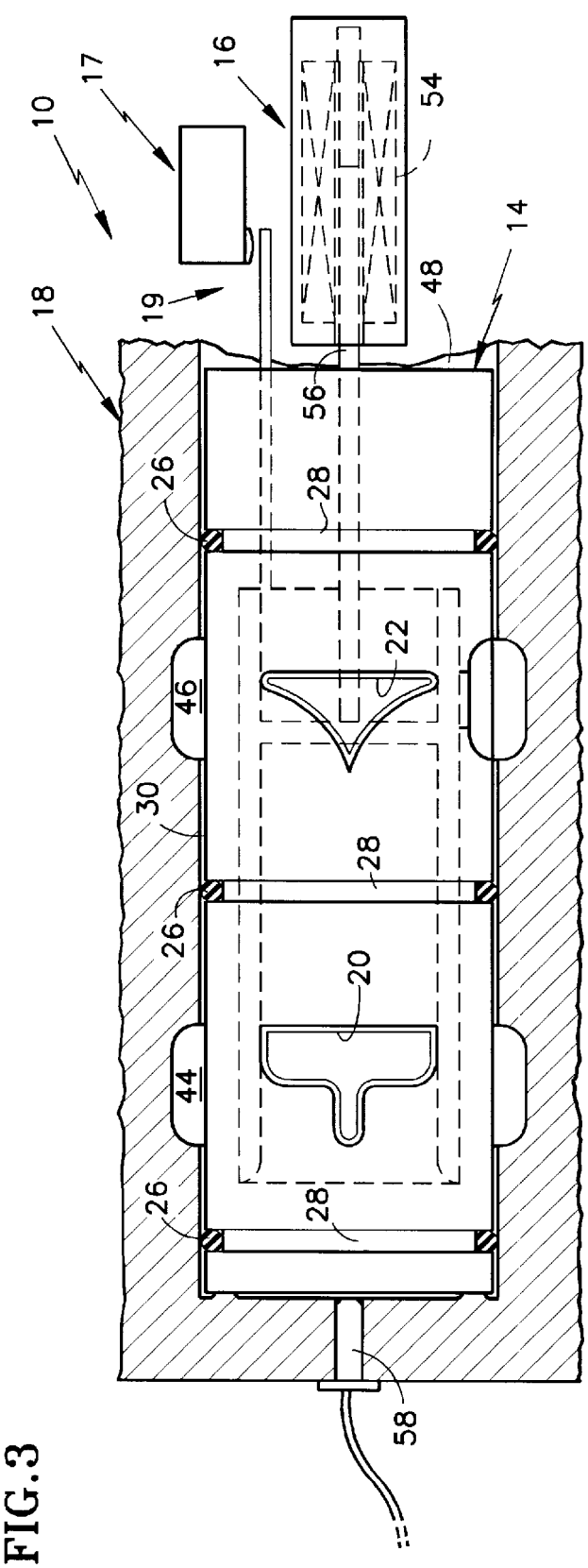

METHOD FOR CONTROLLING THE FLOW RATE OF FUEL WITHIN A GAS TURBINE

This is a division of application Ser. No. 08/635,224, filed on Apr. 17, 1996, (U.S. Pat. No. 5,772,182).

METHOD FOR CONTROLLING THE FLOW RATE OF FUEL WITHIN A GAS TURBINE

The invention was made under a U.S. Government contract and the Government has rights herein.

BACKGROUND OF THE INVENTION

1. Technical Field

This invention applies to gas turbine engine fuel controls in general, and to gas turbine engine fuel flow control valves in particular.

2. Background Information

Fuel control valves for high performance gas turbine powered aircraft must perform with a high degree of accuracy under a wide variety of operating conditions. A valve that meters too little or too much fuel to the combustor could cause a combustor to "blowout", or could hinder reignition within the combustor. To avoid such problems, valve design considers the difference in pressure across the fuel control valve and the mass flow rate of fluid through the valve. These two parameters are generally used to define the required performance of the fuel control valve within the aircraft flight envelope. The difference in pressure ($\Delta_p$) "across" the valve is by consensus defined to be the difference between the pressure of the fuel discharging from the fuel pump less component and piping head losses between the pump discharge and the control valve ($P_{FPD}$) and the pressure of the fuel dispensed within the combustor(s) less component and piping head losses between the control valve and the combustor ($P_{FC}$)

The mass flow rate of the fluid passing through the valve, on the other hand, may be determined by the equation:

$$W_f = KC_d A_v \sqrt{\Delta_p \rho}$$

where $W_f$ represents the mass flow rate of the fluid, K represents a conversion factor constant, $C_d$ represents a discharge coefficient for flow exiting the valve orifice, $A_v$ represents the cross-sectional area of the valve orifice, and $\rho$ represents the density of the fluid. The discharge coefficient ($C_d$) is a coefficient that compensates for less than frictionless ideal flow through an orifice and is a function of: (1) the geometry of the orifice relative to upstream passage geometry; and (2) the Reynolds number of the fluid passing through the orifice. The Reynolds number of the fluid passing through the orifice, in turn, accounts for the velocity of the fluid within the orifice, the dimensions of the orifice, and the kinematic viscosity of the fluid. In instances where the ratio of pressures across the valve ($P_{FPD}/P_{FC}$) is no more than six (6), the discharge coefficient ($C_d$) may be considered a constant for a particular point within the flight envelope. This is in part due to a relatively low fluid velocity through the orifice. In those instances, the mass flow rate of fluid ($W_f$), and therefore the power setting of the engine, can be readily controlled by changing only the cross-sectional area of the valve orifice ($A_v$).

In instances where the ratio of pressures across existing valves exceed six (6), however, the discharge coefficient ($C_d$) often becomes unstable due to cavitation and cannot be considered a constant for a particular point within the flight envelope. Specifically, at pressure ratios greater than six, the velocity of the fluid passing through the orifice is great enough to cause cavitation which in turn prevents a consistent $C_d$ value from being empirically determined. Control of fuel flow rate through the valve in these instances must, therefore, consider at least two variables, one of which is unstable. Under those circumstances accurate fuel flow control through the valve is difficult at best.

To avoid having a ratio of pressures across the fuel control valve in excess of six (6), it is known to use a hydromechanical head regulator, which is a device designed to maintain a particular $\Delta_p$ across a fuel control valve under all conditions. Although head regulators do provide the advantage of a constant $\Delta_p$ across the fuel flow control valve, they also provide several distinct disadvantages. For example, head regulators used in high pressure applications tend to be of considerable size and weight, neither of which is desirable. Head regulators also add a second layer of complexity to the fuel control system; e.g. they require sensor input to operate and a flow valve to regulate a constant head across a metering valve. The sensors and the valves within the head regulator provide additional potential failure modes which are difficult, if not impossible, to diagnose. Head regulators also add significantly to the cost of most gas turbine fuel flow control systems. In short, the advantage of a constant $\Delta_p$ across the control valve is offset by several distinct disadvantages.

What is needed, therefore, is a method for accurately controlling the mass flow rate of fuel within a gas turbine engine that accommodates high pressure differences across the valve, which does not add to the weight, cost, or complexity of the fuel flow control system.

DISCLOSURE OF THE INVENTION

It is, therefore, an object of the present invention to provide a method for accurately controlling the mass flow rate of fuel within a gas turbine engine.

It is another object of the present invention to provide method for controlling the mass flow rate of fuel within a gas turbine engine that accommodates large differences in pressure across the valve.

It is still another object of the present invention to provide a method for controlling the mass flow rate of fuel within a gas turbine engine that minimizes the ill effects of cavitation.

According to the present invention, a method for controlling the mass flow rate of fuel within a gas turbine engine is provided, comprising the steps of:

(a) Providing a fuel flow valve having a first and a second variable orifice, an internal cavity extending between the first and second variable orifices, means for selectively actuating the variable orifices from a closed position where the orifices prevent fluid flow through the valve, to a plurality of open positions where the orifices allow fluid flow through the valve, and means for measuring fuel flow pressure within the internal cavity;

(b) Measuring the fuel pressure within the internal cavity, and quantifying the measurement as a first pressure value;

(c) Measuring the fuel pressure downstream of the valve, and quantifying the measurement as a second pressure value;

(d) Calculating a pressure difference across the second variable orifice by comparing the first and second pressure values; and (e) Metering the mass flow rate of fuel by selectively actuating the valve until the pressure difference across the second variable orifice equals a first desirable predetermined value.

According to one embodiment of the present invention, the sleeve of the fuel flow control valve is disposed within a component housing. The housing includes a fluid inlet means and exit means aligned with the inlet port and exit port of the valve sleeve, respectively.

An advantage of the present invention is that a method for accurately controlling the mass flow rate of fuel within a gas turbine engine is provided. The present fuel flow control valve splits the pressure drop across the entire valve into two discrete pressure drops, and thereby decreases fluid velocity passing through either orifice. Decreasing the fluid velocity through the orifices minimizes cavitation and the $C_d$ instability associated therewith.

Splitting the pressure drop across the valve into two discrete drops also helps prevent detrimental erosion. Cavitation can cause erosion of hardware adjacent the cavitation path and the magnitude of the erosion generally increases with the level of cavitation. The present invention helps minimize erosion by first minimizing cavitation. The present invention also minimizes the detrimental effects of erosion by varying the amount of $\Delta_p$ that occurs across the inlet port versus the exit port. Providing an inlet port geometry that causes a higher percentage of the $\Delta_p$ to occur across the inlet port than the exit port will cause most or all of any cavitation that does occur to do so within the fuel flow control valve where erosion resistant materials may be utilized.

Another advantage of the present invention is that it provides an improvement in leakage performance through the valve. Prior art fuel control valves having a single port with a large pressure drop across the- port are often subject significant leakage because of: (1) the significant pressure difference across the port driving the fluid; and (2) pressure induced mechanical distortion which provides leak paths for the fluid. The leakage negatively affects the performance of the valve by altering the intended flow rate. The present invention, in contrast, splits the pressure drop across the entire valve into two discrete zones. The smaller pressure drop across each port results in less leakage because: (1) the pressure difference driving the fluid is less; and (2) mechanical distortion within the valve is less.

Still another advantage of the present invention is that fuel flow through the valve is readily controlled. The present invention provides a pair of variable orifices which are manipulated by displacing one of the valve block or the sleeve relative to the other. Both orifices may therefore be controlled by a single actuation device sensed by a single position control device. A person of skill in the art will recognize that it is a considerable advantage to simplify mechanical devices and minimize the number of controls required whenever possible.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 1 is a diagrammatic side view showing the component sleeve, and fuel flow control valve in cross-section. The valve is shown in a closed position.

FIG. 2 is a diagrammatic side view showing the component sleeve, and fuel flow control valve in cross-section. The valve is shown in an open position.

FIG. 3 is a diagrammatic top view showing the component sleeve in cross-section. The valve is shown in a closed position.

BEST MODE FOR CARRYING OUT THE INVENTION

Referring to FIG. 1, a fuel flow control valve 10 for a gas turbine engine (not shown) includes a valve block 12 disposed within a sleeve 14, means 16 for displacing one of the sleeve 14 or valve block 12 relative to the other, and means 17 for sensing the displacement of the sleeve 14 or valve block 12 relative to the other. The sleeve 14 is disposed within a component housing 18 attached to the periphery of a gas turbine engine. The sleeve 14 is cylindrically shaped and includes a pair of inlet ports 20, a pair of exit ports 22, and an internal cavity 24. Each inlet port 20 is diametrically opposite the other inlet port 20. Each exit port 22 is diametrically opposite the other exit port 22. "O"-rings 26 positioned within grooves 28 disposed within the outer surface 30 of the sleeve 14 seal between the component housing 18 and the sleeve 14.

The valve block 12 includes a pair of inlet gates 32 and a pair of exit gates 34. The inlet and exit gates 32,34 are separated a distance sufficient to enable communication with the inlet 20 and exit 22 ports, respectively when the valve block 12 is disposed within the sleeve 14. The geometries of the ports 20,22 (see FIG. 3) and gates 32,34 are chosen to provide flow characteristics for whatever application is at hand. Specifically, different geometries can provide different flow rate of changes as the valve block 12 and sleeve 14 are displaced relative to one another; e.g., a step function change, or an exponential change, or a linear change in flow rate. In the embodiments shown in FIGS. 1–3, the valve block 12 is cylindrically shaped and includes openings 36 disposed between the inlet 32 and exit 34 gates. "O"-rings 38 positioned within grooves 40 disposed within the outer surface 42 of the valve block 12 seal between the sleeve 14 and the valve block 12.

The component housing 18 includes an inlet channel 44 and an exit 46 channel disposed within a bore 48 for receiving the sleeve 14. The channels 44,46 are connected by passage means 50,52 which enable fuel to enter the inlet channel 44 and pass out of the exit channel 46. When the sleeve 14 is received within the bore 48, each channel 44,46 forms an annulus around the periphery of the sleeve 14. The aforementioned "O"-rings 26 disposed within the outer surface 30 of the sleeve 14 seal between the component housing 18 and the sleeve 14.

The means 16 for displacing one of the sleeve 14 or valve block 12 relative to the other is shown as an electromechanical solenoid 54 type device. The plunger 56 of the solenoid 54 is attached to the valve block 12 and can be actuated to displace the valve block 12 relative to the valve sleeve 14. Alternatively, the solenoid 54 can be attached to the sleeve 14 for displacing the sleeve 14 relative to the valve block 12. Other linear actuators, including a hydraulic actuator coupled with a hydraulic servo valve (not shown) may be used alternatively. Linear displacement of one of the sleeve 14 or valve block 12 relative to the other may be described as axial displacement.

The means 17 for sensing displacement of the sleeve 14 or valve block 12 relative to the other is a linear variable displacement transducer (LVDI) 19, shown diagrammatically in FIGS. 1–3. A person of skill in the art will recognize that a variety of LVDTs 19 are available for sensing linear displacement including magnetic, optical, and electrical devices. In all cases, the output of the LVDT 19 is calibrated to indicate the position of the valve block 12 and the sleeve 14 relative to one another.

In the operation of the fuel flow control valve 10, the valve 10 may start at a closed position as is shown in FIG.

1. In the closed position, the inlet 32 and exit 34 gates align with the inlet 20 and exit 22 ports, respectively, thereby preventing fluid flow through the ports 20,22 into the cavity 24 of the sleeve 14. The "O"-rings 26 disposed between the outer surface 30 of the sleeve 14 and the component housing 18 prevent fuel from entering the cavity 24 of the sleeve 14 or the component housing 18 via whatever leakage path exists, if any, between the sleeve 14 and the housing 18.

In the completely open position, the inlet gates 32 do not impede the flow of fuel 57 (see FIG. 2) entering the cavity 24 of the sleeve 14 via the inlet port 20. Likewise, the exit gates 34 do not impede the flow of fuel 59 exiting the cavity 24 via the openings 36 and the exit ports 22. Less than maximum fuel flow rate may be accomplished by displacing the valve block 12 relative to the sleeve 14 (or vice versa) such that a portion of the gates 20,22 align with the ports 32,34, thereby impeding the passage of flow therethrough. In all cases, a reference signal value stored in a controller (not shown) is associated with a particular valve position and magnitude of fuel flow. The valve block 12 is displaced until the LVDT 19 signal compares favorably with the reference signal value.

Fuel entering the cavity 24 via the inlet ports 20 is motivated by a difference in pressure between the fuel exiting the fuel pump (not shown) and the fuel within the internal cavity 24 of the sleeve 14. A pressure sensor 58 in communication with the cavity 24 is used to determine pressure within the cavity 24. Fuel exiting the cavity 24 via the exit port 22 is motivated by a difference in pressure between the fuel within the cavity 24 and the fuel within the gas turbine engine combustor(s) (not shown).

Depending upon the application of the fuel flow control valve 10, it may be advantageous to establish one of the inlet 20 or exit 22 ports to perform as a throttling orifice and the other as a metering orifice. If the inlet port 20 acts as a throttle and the exit port 22 as a meter, then the pressure difference between the internal cavity 24 and the combustor(s) (not shown) may be used to calculate the fuel flow rate through the entire valve 10. Measuring the fuel flow rate across only one of the inlet 20 or exit 22 ports eliminates whatever inaccuracies may be associated with including the additional orifice; e.g., port cross-sectional area inaccuracies, pressure difference inaccuracies, etc.

Although this invention has been shown and described with respect to the detailed embodiments thereof, it will be understood by those skilled in the art that various changes in form and detail thereof may be made without departing from the spirit and the scope of the invention. For instance, the actuation of one of the valve block 12 or sleeve 14 relative to the other has heretofore been described as linear actuation. In an alternative embodiment, one of the valve block 12 or sleeve 14 may be rotated relative to the other to open and closed the ports 20,22 of the valve 10. Rotary displacement of one of the sleeve 14 or valve block 12 relative to the other may be described as radial displacement. In the above best mode both the sleeve 14 and the valve block 12 have been described as being cylindrically shaped. In alternative embodiments, one or both of the sleeve 14 and valve block 12 may assume noncylindrical shapes.

We claim:

1. A method for controlling the mass flow rate of fuel within a gas turbine engine, comprising the steps of:
    (a) providing a fuel flow valve having:
        a first variable orifice;
        a second variable orifice;
        an internal cavity extending between said first and second variable orifices; and
        means for selectively actuating said variable orifices from a closed position where said orifices prevent fluid flow through said valve, to a plurality of open positions where said orifices allow fluid flow through said valve; and
        means for measuring fuel pressure within said internal cavity;
    (b) measuring the fuel pressure within said internal cavity, and quantifying said measurement as a first pressure value;
    (c) measuring the fuel pressure downstream of said valve, and quantifying said measurement as a second pressure value;
    (d) calculating a pressure difference across said second variable orifice by comparing said first and second pressure values; and
    (e) metering the mass flow rate of fuel by selectively actuating said valve until said pressure difference across said second variable orifice equals a first desirable predetermined value.

2. A method for controlling the mass flow rate of fuel within a gas turbine engine according to claim 1, further comprising the steps of:
    (a) measuring the fuel pressure upstream of said valve, and quantifying said measurement as a third pressure value;
    (b) calculating a pressure difference across said first variable orifice by comparing said third and first pressure values; and
    (c) throttling said fuel flow by selectively actuating said first variable orifice until said pressure difference across said first variable orifice equals a second desirable predetermined value, wherein said pressure difference across said first variable orifice is greater than said pressure difference across said second variable orifice.

3. A method for controlling the mass flow rate of fuel within a gas turbine engine according to claim 1, wherein said first and second variable orifices are connected and are selectively actuated together.

4. A method for controlling the mass flow rate of fuel within a gas turbine engine according to claim 2, further comprising the step of:
    (a) providing erosion resistant material within said valve to resist the formation of cavitation sponsored erosion within said valve.

5. A method for controlling the mass flow rate of liquid fuel within a gas turbine engine, comprising the steps of:
    (a) providing a valve which includes:
        a sleeve, having an inlet port, an exit port, and an internal cavity connecting said inlet and exit ports; and
        a valve block, having an inlet gate and an exit gate;
        wherein said valve has an open position where fuel enters said valve via said inlet port, passes into said internal cavity, and exits said valve via said exit port, and a closed position where said gates close said ports and prevent fuel flow through said valve;
        means for measuring fuel pressure within said internal cavity;
    (b) measuring the fuel pressure within said internal cavity, and quantifying said measurement as a first pressure value;
    (c) measuring the fuel pressure downstream of said valve, and quantifying said measurement as a second pressure value;

(d) calculating a pressure difference across said exit port by comparing said first and second pressure values; and (e) controlling the mass flow rate of fuel by selectively displacing one of said sleeve or valve block relative to the other of said sleeve or valve block, thereby opening or closing said inlet and exit ports via said inlet and exit gates, until said pressure difference across said exit port equals a first desirable predetermined value.

6. A method for controlling the mass flow rate of fuel within a gas turbine engine according to claim 5, wherein said valve further comprises:

means for sensing the position of said sleeve relative to said valve block.

7. A method for controlling the mass flow rate of fuel within a gas turbine engine according to claim 5, wherein said valve further comprises:

means for selectively actuating said inlet and exit ports and said inlet and exit gates in concert.

8. A method for controlling cavitation within a gas turbine engine fuel system, comprising the steps of:

(a) providing a valve for controlling the flow of fuel, said valve including a sleeve, having an inlet port and an exit port, each having a cross-sectional area; and a valve block, having an inlet gate and an exit gate;

wherein said one of said sleeve or said valve block may be displaced relative to the other of said sleeve or said valve block from a closed position where said gates close said ports and thereby prevent fluid flow through said valve via said ports, to a plurality of open positions where said gates less than completely close said ports, and thereby allow fluid flow through said valve via said ports;

(b) pumping fuel through said valve, wherein fuel passing through said valve experiences a first pressure drop across said inlet port and a second pressure drop across said exit port;

(c) altering said inlet and exit ports such that said first pressure drop is greater than said second pressure drop;

(d) providing erosion resistant material within said valve to resist the formation of cavitation sponsored erosion within said valve.

* * * * *